United States Patent [19]

Haug et al.

[11] Patent Number: 4,518,748

[45] Date of Patent: May 21, 1985

[54] CURABLE EPOXY RESIN MIXTURES

[75] Inventors: Theobald Haug, Frenkendorf; Friedrich Stockinger, Hölstein, both of Switzerland

[73] Assignee: Ciba Geigy Corporation, Ardsley, N.Y.

[21] Appl. No.: 568,684

[22] Filed: Jan. 6, 1984

[30] Foreign Application Priority Data

Jan. 13, 1983 [CH] Switzerland .................... 174/83

[51] Int. Cl.³ .............................................. C08L 63/02
[52] U.S. Cl. ................................... 525/481; 525/489; 525/510; 525/523
[58] Field of Search ............... 525/481, 523, 489, 510; 528/128, 155

[56] References Cited

U.S. PATENT DOCUMENTS

| | | | |
|---|---|---|---|
| 3,285,991 | 11/1966 | Sellers | 525/481 |
| 3,714,121 | 1/1973 | Kobel et al. | 525/481 |
| 4,278,733 | 7/1981 | Benzinger | 428/413 |

FOREIGN PATENT DOCUMENTS 2217099 9/1973 Fed. Rep. of Germany.

*Primary Examiner*—Theodore E. Pertilla
*Attorney, Agent, or Firm*—Luther A. R. Hall

[57] ABSTRACT

Curable mixtures containing (a) epoxide compounds with on average more than one 1,2-epoxide group per molecule, (b) the condensates prepared from certain phenols, certain amines and aldehydes or ketones in an acid medium and, where relevant, (c) curing accelerators. The novel curable mixtures have a good storage stability and give shaped substances with outstanding resistance to chemicals.

16 Claims, No Drawings

CURABLE EPOXY RESIN MIXTURES

The present invention relates to curable epoxy resin mixtures which contain, as the curing agent, condensation products which have been prepared in an acid medium from certain phenols, certain aromatic amines and aldehydes or ketones.

As is known, novolaks can also be used as curing agents for epoxy resins. It is also known that the properties of cured epoxy resins can be improved by using phenol/formaldehyde condensates modified with aromatic amines, preferably aniline, as the curing agent.

The phenol/formaldehyde condensates modified with aniline which are described in U.S. Pat. Nos. 3,714,121 and 4,278,733 are prepared in a neutral or basic medium and are thus resoles.

German Offenlegungsschrift No. 2,217,099 discloses, as curing agents for epoxy resins, certain aniline-modified condensates which are obtained by condensing aniline and phenol simultaneously with formaldehyde in a molar ratio of approximately 1:1:2, the condensation being carried out in the presence of alkaline or acid catalysts. The epoxy resins cured with such condensates have only low heat distortion points.

It has now been found that condensates prepared in an acid medium from certain phenols and certain aromatic amines and aldehydes and ketones are more useful curing agents for epoxy resins, since they can be processed more easily with epoxy resins, have a better storage stability with epoxy resins and impart to the cured epoxy resins a better resistance to chemicals.

The present invention thus relates to curable mixtures containing (a) epoxide compounds with on average more than one 1,2-epoxide group per molecule, (b) condensates prepared in an acid medium from phenols, amines and aldehydes or ketones, which are obtainable by reacting (1) substituted monohydric phenols which are unsubstituted in the p-position and in one of the two o-positions or in both o-positions, unsubstituted dihydric mononuclear phenols or unsubstituted or substituted dihydric or polyhydric, dinuclear or polynuclear phenols which contain at least two reactive nucleus positions for reaction with an aldehyde or ketone, (2) substituted aromatic monoamines which contain at least one, preferably at least two, reactive nucleus positions for reaction with an aldehyde or ketone, unsubstituted aromatic mononuclear or dinuclear diamines or substituted aromatic mononuclear or dinuclear diamines which contain at least two reactive nucleus positions for reaction with an aldehyde or ketone, and (3) aldehydes or ketones with one another at a pH value of not more than 6, the molar ratio of phenol to amine to aldehyde or ketone in the reaction mixture being 1:1:1.2 to 6:1:8, preferably 2:1:4 to 6:1:8 and in particular 3:1:5 to 6:1:8, and, where relevant, (c) curing accelerators, 0.9 to 1.5 equivalents of active hydrogen atoms, based on the OH and $NH_2$ group, being present in the curable mixture per 1 epoxide equivalent.

Preferably, the mixtures according to the invention contain, as the epoxide compounds (a), those with aromatic groupings in the molecule, such as, for example, polyglycidyl ethers of polyhydric phenols or N-glycidyl compounds of aromatic amines, and, as condensates (b), those in which the reaction components (1) are substituted monohydric phenols which are unsubstituted in the p-position and in one of the o-positions or in both o-positions, or substituted dihydric or polyhydric dinuclear or polynuclear phenols which contain at least two reactive nucleus positions for reaction with an aldehyde or ketone, and reaction components (2) are substituted aromatic monoamines which contain at least one, preferably two, reactive nucleus positions for reaction with an aldehyde or ketone, or unsubstituted or substituted aromatic dinuclear diamines which contain at least two reactive nucleus positions for reaction with an aldehyde or ketone.

The mixtures according to the invention contain, in particular, as condensates (b), those in which reaction component (1) is an o- or p-alkylphenol or a dihydric dinuclear phenol which is substituted in the o,o'-position, reaction component (2) is o- or p-toluidine, 2,6-diethylaniline, 4,4'-diaminodiphenylsulfone or 4,4'-diamino-3,3'-dimethyldiphenyl-methane and reaction component (3) is formaldehyde, acetaldehyde, propionaldhyde or acetone.

Those condensates (b) which have been prepared at a pH value of 5.5 to 0.5 are also preferred in the mixtures according to the invention.

Suitable epoxide compounds (a) which can be used in the curable mixtures are all types of epoxy resins, for example those which contain, directly bonded to oxygen, nitrogen or sulfur atoms, groups of the formula I

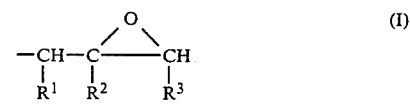

in which either $R^1$ and $R^3$ are each a hydrogen atom, in which case $R^2$ is then a hydrogen atom or a methyl group, or $R^1$ and $R^3$ together are $-CH_2CH_2-$, in which case $R^2$ is then a hydrogen atom.

Examples of such resins are polyglycidyl and poly(β-methylglycidyl) esters, which can be obtained by reacting a compound containing two or more carboxylic acid groups per molecule with epichlorohydrin, glycerol dichlorohydrin or β-methylepichlorohydrin in the presence of an alkali. Such polyglycidyl esters can be derived from aliphatic polycarboxylic acids, for example oxalic acid, succinic acid, glutaric acid, adipic acid, pimelic acid, suberic acid, azelaic acid, sebacic acid or dimerised or trimerised linoleic acid, from cycloaliphatic polycarboxylic acids, such as tetrahydrophthalic acid, 4-methyltetrahydrophthalic acid, hexahydrophthalic acid and 4-methylhexahydrophthalic acid, and from aromatic polycarboxylic acids, such as phthalic acid, isophthalic acid and terephthalic acid.

Further examples are polyglycidyl and poly-(β-methylglycidyl) ethers, which can be obtained by reacting a compound containing at least two free alcoholic and/or phenolic hydroxyl groups per molecule with the corresponding epichlorohydrin under alkaline conditions, or in the presence of an acid catalyst with subsequent alkali treatment. These ethers can be prepared using poly-(epichlorohydrin) from acyclic alcohols, such as ethylene glycol, diethylene glycol and higher poly-(oxyethylene) glycols, propane-1,2-diol and poly-(oxypropylene) glycols, propane-1,3-diol, butane-1,4-diol, poly-(oxytetramethylene) glycols, pentane-1,5-diol, hexane-1,6-diol, hexane-2,4,6-triol, glycerol, 1,1,1-trimethylpropane, pentaerythritol and sorbitol, from cycloaliphatic alcohols, such as resorcitol, quinitol, bis-(4-hydroxycyclohexyl)-methane, 2,2-bis-(4-hydroxycyclohexyl)-propane and 1,1-bis-(hydroxymethyl)-cyclohex-3-ene, and from alcohols with aromatic nuclei, such as N,N-bis-(2-hydroxyethyl)-aniline and p,p'-bis-(2-hydroxyethylamino)-diphenylmethane. They can furthermore be prepared from mononuclear phenols, such as resorcinol and hydroquinone, and polynuclear phenols, such as bis-(4-hydroxyphenyl)-methane, 4,4-dihydroxydiphenyl, bis-(4-hydroxyphenyl) sulfone, 1,1,2,2-tetrakis-(4-hydroxyphenyl)-ethane, 2,2-bis-(4-hydroxyphenyl)-propane (otherwise known as bisphenol A) and 2,2-bis-(3,5-dibromo-4-hydroxyphenyl)-propane and novolaks formed from aldehydes, such as formaldehyde, acetaldehyde, chloral and furfurol, with phenols, such as phenol itself and phenol which is ring-substituted by chlorine atoms or alkyl groups having in each case up to nine carbon atoms, such as 4-chlorophenol, 2-methylphenol and 4-tert.-butylphenol.

Poly-(N-glycidyl) compounds include, for example, those which are obtained by dehydrochlorination of the reaction products of epichlorohydrin with amines containing at least two amino-hydrogen atoms, such as aniline, n-butylamine, bis-(4-aminophenyl)-methane and bis-(4-methylaminophenyl)-methane, Triglycidyl isocyanurate and N,N'-diglycidyl derivatives of cyclic alkyleneureas, such as ethyleneurea and 1,3-propyleneurea, and hydantoins, such 5,5-dimethylhydantoin.

Examples of poly-(S-glycidyl) compounds are the di-S-glycidyl derivatives of dithiols such as ethane-1,2-dithiol and bis-(4-mercaptomethylphenyl) ether.

Examples of epoxy resins with groups of the formula IV in which $R^5$ and $R^7$ together are a —$CH_2CH_2$— group are bis-(2,3-epoxycyclophenyl) ether, 2,3-epoxycyclopentylglycidyl ether and 1,2-bis-(2,3-epoxycyclopentyloxy)-ethane.

Epoxy resins in which the 1,2-epoxide groups are bonded to different types of hetero-atoms are also suitable, for example the N,N,O-triglycidyl derivatives of 4-aminophenol, the glycidyl ether/glycidyl ester of salicylic acid or p-hydroxybenzoic acid, N-glycidyl-N'-(2-glycidyloxypropyl)-5,5-dimethylhydantoin and 2-glycidyloxy-1,3-bis-(5,5-dimethyl-1-glycidylhydantoin-3-yl)-propane.

If desired, mixtures of epoxy resins can be used.

Preferred epoxy resins are those with an aromatic grouping in the molecule, for example polyglycidyl ethers of polyhydric phenols or N-glycidyl compounds of aromatic amines.

Particularly preferred epoxy resins are the polyglycidyl ethers of polyhydric phenols, such as, for example, polyglycidyl ethers of 2,2-bis-(4-hydroxyphenyl)-propane, bis-(4-hydroxyphenyl)-methane, 2,2-bis-(p-hydroxytetrabromophenyl)-propane, tetra-(p-hydroxyphenyl)-ethane or a novolak which is formed from formaldehyde and phenol or phenol substituted by a chlorine atom or an alkyl group and has a 1,2-epoxide content in excess of 0.5 equivalent/kg.

The condensates (b) obtainable in an acid medium can be prepared by the processes described in "Methoden der organischen Chemie (Houben-Weyl)" ("Methods of organic Chemistry (Houben-Weyl)"), volume XIV/2 (1963), pages 201 to 213, or in German Offenlegungsschrift No. 2,217,099, by subjecting the corresponding phenols (1), amines (2) and aldehydes or ketones (3) to the condensation reaction at a pH value of not more than 6, preferably at a pH value of 5.5 to 0.5, it being possible for this reaction to be carried out in one or more stages. For example, it is possible first to prepare a precondensate from the phenol (1) or the amine (2) and the aldehyde or ketone (3), and then to react the precondensate which the third component, if appropriate with further addition of aldehyde or ketone, to give the condensate (b).

Both the phenols used for the preparation of the condensates (b) and the amines used can be substituted by any substituent which does not participate in the condensation reaction, i.e. is neutral. Examples of such substituents are halogen atoms, preferably chlorine or bromine atoms, alkyl groups, preferably those having 1 to 4 C atoms, halogenated alkyl groups, alkenyl groups having not more than 4 C atoms, for example allyl or prop-1-enyl, alkoxy groups, preferably having 1 to 4 C atoms, or esterified carboxyl groups having 1 to 4 C atoms in the alcohol component.

Examples of suitable substituted monohydric phenols (1) are p-chlorophenol, o-bromophenol, o-cresol, p-cresol, p-chloro-m-cresol, o-allylphenol, 2-propenyl-phenol, p-nonylphenol, o-methoxyphenol, o-ethoxyphenol, p-nitrophenol, p-phenylphenol, o-phenolsulfonic acid, thymol, carvacrol, the xylenols 1,2-dimethyl-3-hydroxybenzene, 1,2-dimethyl-4-hydroxybenzene and 1,4-dimethyl-2-hydroxybenzene, and also guaiacol.

The unsubstituted dihydric mononuclear phenols (1) are pyrocatechol, resorcinol and hydroquinone.

Examples of suitable unsubstituted or substituted dihydric dinuclear phenols (1) are those of the formula II

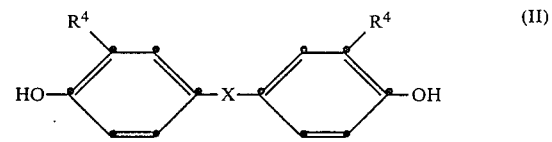

in which the radicals $R^4$ are each a hydrogen atom, a halogen atom, alkyl having 1 to 9 C atoms, alkenyl having not more than 4 C atoms or alkoxy having 1 to 4 C atoms and X is a single bond, alkylene having not more than 5 C atoms, cycloalkylene, preferably cyclohexylene, —$SO_2$—, —SO—, —S— or —O—. Examples of compounds of the formula II, which are known compounds, are 2,2-bis-(3-methyl-4-hydroxyphenyl)-propane, 2,2-bis-(3-chloromethyl-4-hydroxyphenyl)-propane, bis(3-tert.-butyl-4-hydroxyphenyl) sulfone, bis-(3-allyl-4-hydroxyphenyl)-methane, 4,4'-dihydroxydiphenyl, 2,4-bis-(4-hydroxyphenyl)-2-methylbutane and bis-(4-hydroxyphenyl)-methane.

Examples of suitable substituted polyhydric polynuclear phenols (1) are those of the formula III

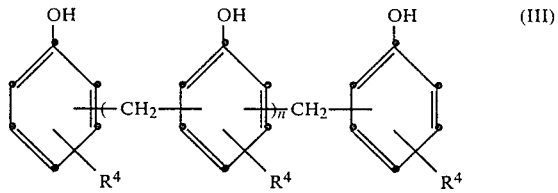

in which $R^4$ is as defined for formula II and n is a number from 1 to 10.

The compounds of the formula III are known compounds and can be prepared by reacting the phenol substituted by $R^4$ with formaldehyde to give the corresponding novolaks in a known manner.

Examples of substituted aromatic monoamines (2) are o-, p- or m-toluidine, o,o'- or o,p-dimethylaniline, o,o'- or o,p-diethylaniline, o-methyl-o'-ethylaniline, o-isopropyl-o'-methylaniline and sulfanilic acid.

The unsubstituted aromatic mononuclear diamines (2) are o-, m- and p-phenylenediamine, which may or may not be dialkylated.

Examples of suitable unsubstituted or substituted aromatic dinuclear diamines (2) are those of the formula IV

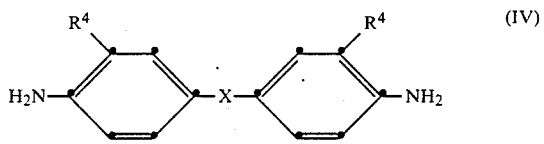

in which $R^4$ and X are as defined in formula II.

The compounds of the formula IV are known, and examples are 4,4'-diaminodiphenylmethane, 3,3'-dimethyl-4,4'-diaminodiphenylmethane, bis-(4-aminophenyl)-2,2-propane, 4,4'-diaminodiphenyl ether, 4,4'-diaminodiphenyl sulfone, 4,4'-diaminodiphenyl sulfide and 4,4'-diaminodiphenyl ether.

Examples of suitable aromatic dinuclear, unsubstituted or substituted diamines are also 1,5-diaminonaphthalene and its monoalkyl- or dialkyl-substituted derivatives.

In principle, all compounds with an aldehyde or reactive keto group can be used as the aldehyde or ketone (3) for the preparation of the acid condensates (b). Commercially available aldehydes or ketones are preferably used, for example formaldehyde, acetaldehyde, propionaldehyde, chloral, bromal, benzaldehyde, furfural, acetone, diethyl ketone, acetophenone and benzophenone. Formaldehyde, acetaldehyde, propionaldehyde or acetone is used in particular.

If desired, curing accelerators or catalysts can be added to the curable mixtures according to the invention curing thereof. Examples of suitable compounds of this type are quaternary ammonium salts, imidazoles, imidazolines and phosphonium salts of organic or inorganic acids. However, any other catalysts which effectively accelerate the reaction of a 1,2-epoxide group with a phenolic hydroxyl group can also be used.

The curing accelerators or catalysts are used in an amount of 0.01 to 10% by weight, preferably 0.1 to 5% by weight, based on the total weight of epoxide compound (a) and condensate (b).

The curable mixtures according to the invention are used in particular in the fields of surface protection, electrotechnology, lamination processes and construction. They can be used in the particular formulation adapted to the specific intended use, in the non-filled or filled state, if appropriate in the form of solutions or dispersions, of lacquers, moulding compositions, sinter powders, immersion resins, injection moulding formulations, impregnating resins, binders and, in particular, agglomerating resins.

The invention thus also relates to a process for the production of crosslinked, insoluble and infusible plastics products, which comprises reacting epoxide compounds with on average more than one epoxide group in the molecule with condensates prepared in an acid medium from phenols, amines and aldehydes or ketones, at temperatures between 120° and 250° C., preferably 150° and 200° C.

The production, according to the invention, of the crosslinked, infusible products is as a rule effected with simultaneous shaping to give shaped articles, sheet-like structures, laminates, bindings or foams. The convential additives of the technology of curable plastics, such as fillers, plasticisers, pigments, dyes, mould release agents, blowing agents and flameproofing substances, can be added to the curable compositions. Examples of fillers which can be used are glass fibres, mica, quartz flour, kaolin, colloidal silicon dioxide and metal powders; calcium stearate, for example, can be used as a mould release agent, and azodicarboxylic acid amides, α,α'-azoisobutyronitrile or organic sulfohydrazides, for example, can be used as blowing agents.

Preparation of the condensates from phenols, amines and aldehydes or ketones in an acid medium Condensate I 1.35 kg of o-cresol and 0.446 kg of o-toluidine are initially introduced into a kettle equipped with a stirrer, thermometer, dropping funnel, reflux condenser and gas inlet tube, and the components are mixed and the air in the flask is displaced with nitrogen. 0.512 kg of anhydrous acetic acid is then allowed to run in, whereupon an exothermic reaction starts. The mixture is warmed to 85° C., before 0.623 kg of paraformaldehyde is added, in the course of 30 minutes. This addition causes a sharp rise in temperature of the contents of the flask up to 115° C. When the exothermic reaction has subsided, the product is stirred under nitrogen at about 95° C. for 10 hours. The heating bath is then removed and 2.8 kg of acetone are allowed to run in, whereupon the temperature falls to about 60° C. 0.17 kg of ammonia gas is then passed in for about 2 hours and the inhomogeneous liquid is allowed to cool to room temperature and is left to stand until the two layers have separated completely. The organic phase is separated off and added dropwise to 9 kg of an ice-water mixture during the course of about 1 hour, with vigorous stirring, a solid substance precipitating. This substance is filtered off and the residue on the filter is washed with a large amount of water and then dried. 1.92 kg of a light beige powder with a softening point of 129° C. are obtained.

Condensate II 248.3 g (1.0 mole) of 4,4'-diaminodiphenyl sulfone, 648.8 g (6.0 moles) of o-cresol and 189.1 g (2.1 moles) of oxalic acid are initially introduced into a 4.5 liter sulfonating flask equipped with a metal anchor-type stirrer, a thermometer, a reflux condenser and a dropping funnel, and 528 g (6.5 moles) of 37% aqueous formaldehyde are added dropwise at a temperature of 83° C. to 93° C. in the course of 35 minutes, with stirring. The reaction mixture is left to react at the boiling point for 3 hours and 40 minutes and is then neutralised with 589.2 g of 40% aqueous potassium hydroxide (4.2 moles), the aqueous phase is decanted off, 1 litre of boiling water is added and the reaction mixture is stirred for 10 minutes and decanted off, and the operation is repeated 6 times. After the soluble constituents have been washed out, the reaction mixture is dissolved in 2 liters of acetone, the solution is filtered and the filtrate is introduced into 36 liters of ice-water, which is thoroughly mixed vigorously with a turbo stirrer. The product precipitated is filtered off, washed with water and then dried at 50° C. in vacuo.

848.9 of a yellowish powder with a Kofler softening point of 148° C. are obtained.

Condensate III 149.2 g (1.0 mole) of 2,6-diethylaniline, 368.4 g of an industrially prepared o-cresol novolak (equivalent weight: 122.8), 101.5 g (1.25 moles) of 37% aqueous formaldehyde and 107.9 g (0.55 mole) of 50% aqueous sulfuric acid are reacted for 4 hours and 24 minutes in accordance with the preparation of condensate II, and the mixture is then neutralised with 123.4 g (1.10 moles) of 50% aqueous potassium hydroxide. The condensate is worked up as for condensate II, and 518.6 g of a beige pulverulent novolak with a Kofler softening point of 100° C. are obtained.

Condensate IV 242.4 g (2.0 moles) of 2,4-dimethylaniline, 491.2 g of an industrially prepared o-cresol/formaldehyde novolak (average molecular weight $M_n=714$; OH equivalent weight = 122.8), 215.8 g (1.1 moles) of 50% sulfuric acid and 202.9 g (2.5 moles) of 37% formaldehyde are reacted for 4 hours and 40 minutes and the mixture is then neutralised with 246.8 g (2.2 moles) of 50% potassium hydroxide solution. The aqueous phase is decanted off, 1 liter of boiling water is added and the reaction mixture is stirred for 10 minutes and decanted off, and the operation is repeated 6 times. After the water-soluble constituents have been washed out, the reaction mixture is dissolved in 1.5 litres of acetone, the solution is filtered and the filtrate is introduced into 24 liters of ice-water, which is thoroughly mixed vigorously with a turbo stirrer. The precipitated product is filtered off, washed with water and then dried at 50° C. in vacuo. The yield is 689.8 g. The reaction product has a Kofler softening point of 98° C.

EXAMPLE 1

A 60 percent by weight solution is prepared from 162 g of 1,1,2,2-tetra-(p-glycidyloxyphenyl)-ethane (ERRA ® 0163), 245 g of tetrabromobisphenol A diglycidyl ether with an average epoxide content of 2.75 equivalents/kg and a bromine content of 48.5%, 263 g of condensate I and methyl ethyl ketone. A glass mat is impregnated with this solution and is then dried at 140° C. A so-called prepreg is formed. In each case 8 layers of this prepreg are pressed at 170° C. under a pressure of $29.4 \times 10^4$ Pa for 2 hours, a laminated board being formed.

After exposure of laminated samples ($5 \times 5$ cm) to the vapour of boiling trichloroethylene for 2 minutes, their increase in weight is only 0.04%. Trichloroethylene is a solvent frequently used in the printed circuit board industry. It is therefore important that as little as possible thereof is absorbed.

EXAMPLE 2

800 g of 1,1,2,2-tetra-(p-glycidyloxyphenyl)-ethane and 800 g of tetrabromobisphenol A diglycidyl ether with an average epoxide content of 2.75 eqivalents/kg are warmed at 185° C. to 190° C. for 12 hours in the presence of catalytic amounts of 2-phenylimidazole. An epoxy resin with an epoxide equivalent weight of 227 is thereby formed. 646 g of this epoxy resin, 375 g of condensate I and 1.0 g of 2-phenylimidazole are dissolved in methyl ethyl ketone (concentration about 55 percent by weight). This solution is used together with a glass mat for the production of laminates, as described in Example 1. The glass transition temperature, measured with a differential thermoanalyser, is 191° C. The uptake of trifluoroethylene, measured as in Example 1, is 0.02%.

EXAMPLE 3

An impregnating solution is prepared from 161 g of N,N,N',N'-tetraglycidyl-4,4-diaminodiphenylmethane (average epoxide content 8.0 equivalents/kg), 290 g of tetrabromobisphenol A diglycidyl ether (average epoxide content 2.75 equivalents/kg), 363 g of condensate I and 540 g of methyl ethyl ketone. Laminates are prepared from this solution and a glass mat as described in Example 1, and their uptake of trichloroethylene vapour is determined, and is 0.01 percent by weight.

EXAMPLE 4

A 60 percent by weight laminating solution is prepared from 171 g of 1,1,2,2-tetraglycidyloxyphenylethane, 258 g of tetrabromobisphenol A diglycidyl ether (average epoxide content 2.75 equivalents/kg), 245 g of condensate II and 450 g of methyl ethyl ketone. Laminates are produced with this solution and a glass mat as described in Example 1, and their uptake of trichloroethylene vapour is determined, and is 0.01% by weight. The storage stability of the finished impregnating solution is 24 days.

EXAMPLE 5

162 g of 1,1,2,2-tetra-(p-glycidyloxyphenyl)ethane, 275 g of tetrabromobisphenol A diglycidyl ether (average epoxide content 2.75 equvalents/kg), 143 g of a bisphenol A digylcidyl ether prelengthened with tetrabromobisphenol A by the advancement method (average bromine content 21 percent by weight, epoxide content 2.1 equivalents/kg) and 272 g of condensate III are dissolved together in 500 g of methyl ethyl ketone. In order to achieve shorter processing times, the addition of 3.0 g of 2-phenylimidazole is recommended.

Laminates are produced from this solution and a glass mat as described in Example 1, and their uptake of trichloroethylene is determined, and is 0.05 percent by weight. The same change in weight is found if no 2-phenylimidazole is used.

EXAMPLE 6

19.0 g of bisphenol A diglycidyl ether with an epoxide content of 5.3 equivalents/kg, 10.7 g of condensate I and 0.08 g of 2-phenylimidazole are mixed as thoroughly as possible and are melted at 100° C. The melt is cast in a mould about 2 mm high and is cured at 170° C. for 2 hours. Thermogravimetric analysis of the resulting hard shaped substance shows a weight loss of only 1.7% in the industrially interesting temperature range up to 250° C.

EXAMPLE 7

A 60 percent by weight impregnating solution in methyl ethyl ketone is prepared from 269.6 g of a bisphenol A diglycidyl ether prelengthened with tetrabromobisphenol A by the advancement method (average bromine content 21% by weight, epoxide content 2.1 equivalents/kg), 171.2 g of tetrabromobisphenol A diglycidyl ether, 107.2 g of 1,1,2,2-tetraglycidyloxyphenylethane, 196.0 g of condensate I and 0.92 g of phenylimidazole. the initial viscosity of this solution doubles in the course of 19 days at 25° C.

EXAMPLE 8

144 g of 1,1,2,2-tetra-(p-glycidyloxyphenyl)-ethane, 259 g tetrabromobisphenol A diglycidyl ether (average epoxide content 2.75 equivalents/kg) and 300 g of condensate IV are dissolved together in 484 g of methylglycol. A glass mat is impregnated with this solution and is then dried at 170° C., a so-called prepreg being formed. In each case 8 layers of this prepreg are pressed at 170° C. under a pressure of $29 \times 10^4$ Pa for 2 hours, laminated sheets being formed. After exposure of laminated samples ($5 \times 5$ cm) to the vapour of boiling trichloroethylene for 2 minutes, their weight increase is only 0.09%.

What is claimed is:

1. A curable mixture comprising
   (a) an epoxide compound with on average more than one 1,2-epoxide group per molecule,
   (b) a condensate prepared in an acid medium from a phenol, amine and aldehyde or ketone, which is obtainable by reacting (1) a substituted monohydric phenol which is unsubstituted in the p-position and in one of the two o-positions or in both o-positions, an unsubstituted dihydric mononuclear phenol or an unsubstituted or substituted dihydric or polyhydric, dinuclear or polynuclear phenol which contains at least two reactive nucleus positions for reaction with an aldehyde or ketone, (2) a substituted aromatic monoamine which contains at least one reactive nucleus position for reaction with an aldehyde or ketone, an unsubstituted aromatic mononuclear or dinuclear diamine or a substituted aromatic mononuclear or dinuclear diamine which contains at least two reactive nucleus positions for reaction with an aldehyde or ketone, and (3) an aldehyde or ketone, with one another at a pH value of not more than 6, the molar ratio of phenol to amine to aldehyde or ketone in the reaction mixture being 1:1:1.2 to 6:1:8, and 0.9 to 1.5 equivalents of active hydrogen atoms, based on the OH and $NH_2$ group, being present in the curable mixture per 1 epoxide equivalent.

2. A mixture according to claim 1 which contains an epoxide compound (a) with an aromatic group in the molecule.

3. A mixture according to claim 1, which contains a polyglycidyl ether of a polyhydric phenol or an N-glycidyl compound of an aromatic amine as the epoxide compound (a).

4. A mixture according to claim 1, which contains a condensate (b) in which reaction component (1) is a substituted monohydric phenol which is unsubstituted in the p-position and in one of the two o-positions or in the two o-positions, or is a substituted dihydric or polyhydric dinuclear or polynuclear phenol which contains at least two reactive nucleus positions for reaction with an aldehyde or ketone.

5. A mixture according to claim 1, which contains a condensate (b) in which reaction component (2) is a substituted aromatic monoamine which contains at least one reactive nucleus position for reaction with an aldehyde or ketone, or is an unsubstituted or substituted aromatic dinuclear diamine which contains at least two reactive nucleus positions for reaction with an aldehyde or ketone.

6. A mixture according to claim 1 wherein the substituted aromatic monoamine of component (2) contains at least two reactive nucleus positions.

7. A mixture according to claim 1 which additionally contains (c) a curing accelerator.

8. A mixture according to claim 4, which contains a condensate (b) in which reaction component (1) is an o- or p-alkylphenol or a dihydric dinuclear phenol substituted in the o,o'-position.

9. A mixture according to claim 5, which contains a condensate (b) in which reaction component (2) is o- or p-toluidine, 2,6-diethylaniline, 4,4'-diaminodiphenyl sulfone or 4,4'-diamino-3,3'-dimethyldiphenyl-methane.

10. A mixture according to claim 1, which contains a condensate (b) in which reaction component (3) is formaldehyde, acetaldehyde, propionaldehyde or acetone.

11. A mixture according to claim 1 which contains a condensate (b) which has been condensed at a pH value of 5.5 to 0.5.

12. A mixture according to claim 1, which contains a condensate (b) which has been obtained from a reaction mixture with a ratio of phenol to amine to aldehyde or ketone of 2:1:4 to 6:1:8.

13. A mixture according to claim 12, wherein the ratio in the mixture is 3:1:5 to 6:1:8.

14. A mixture according to claim 5 wherein the reaction component (2) is a substituted aromatic monoamine containing at least two reactive nucleus positions.

15. A process for the production of a crosslinked, insoluble and infusible plastics product from a curable mixture according to claim 1, which comprises curing the mixture in the temperature range from 120° to 250° C.

16. A process according to claim 15 where curing is carried out at a temperature range from 150° to 200° C.

* * * * *